Patented Jan. 7, 1941

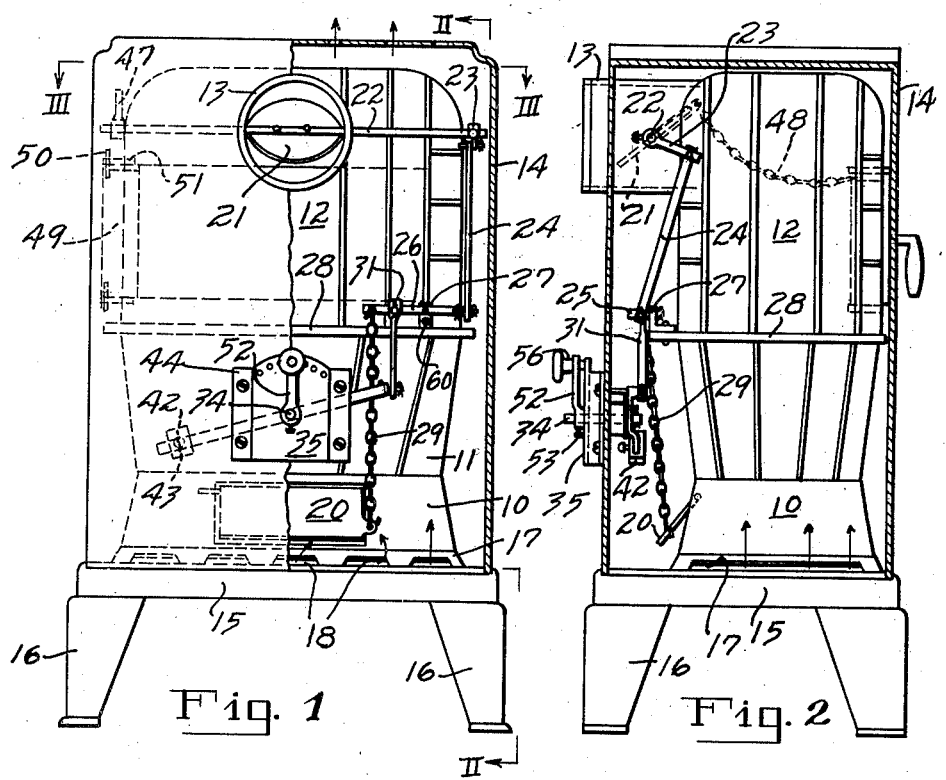
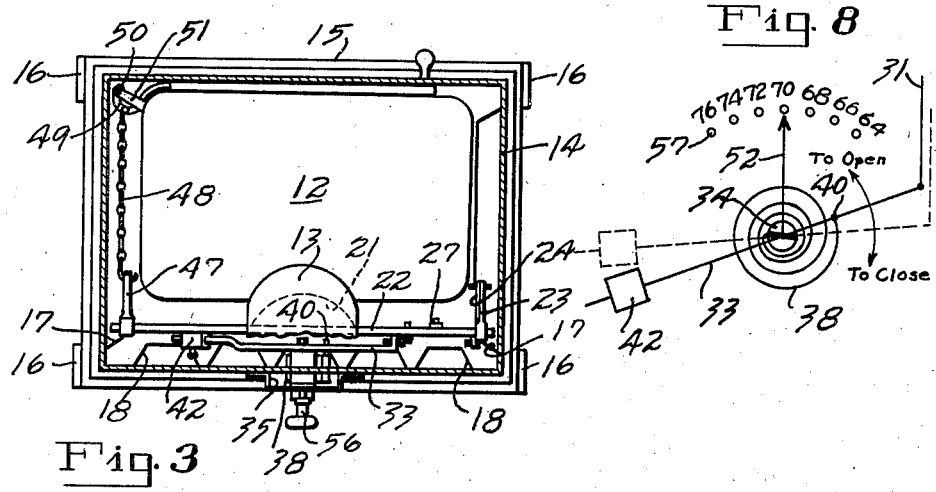

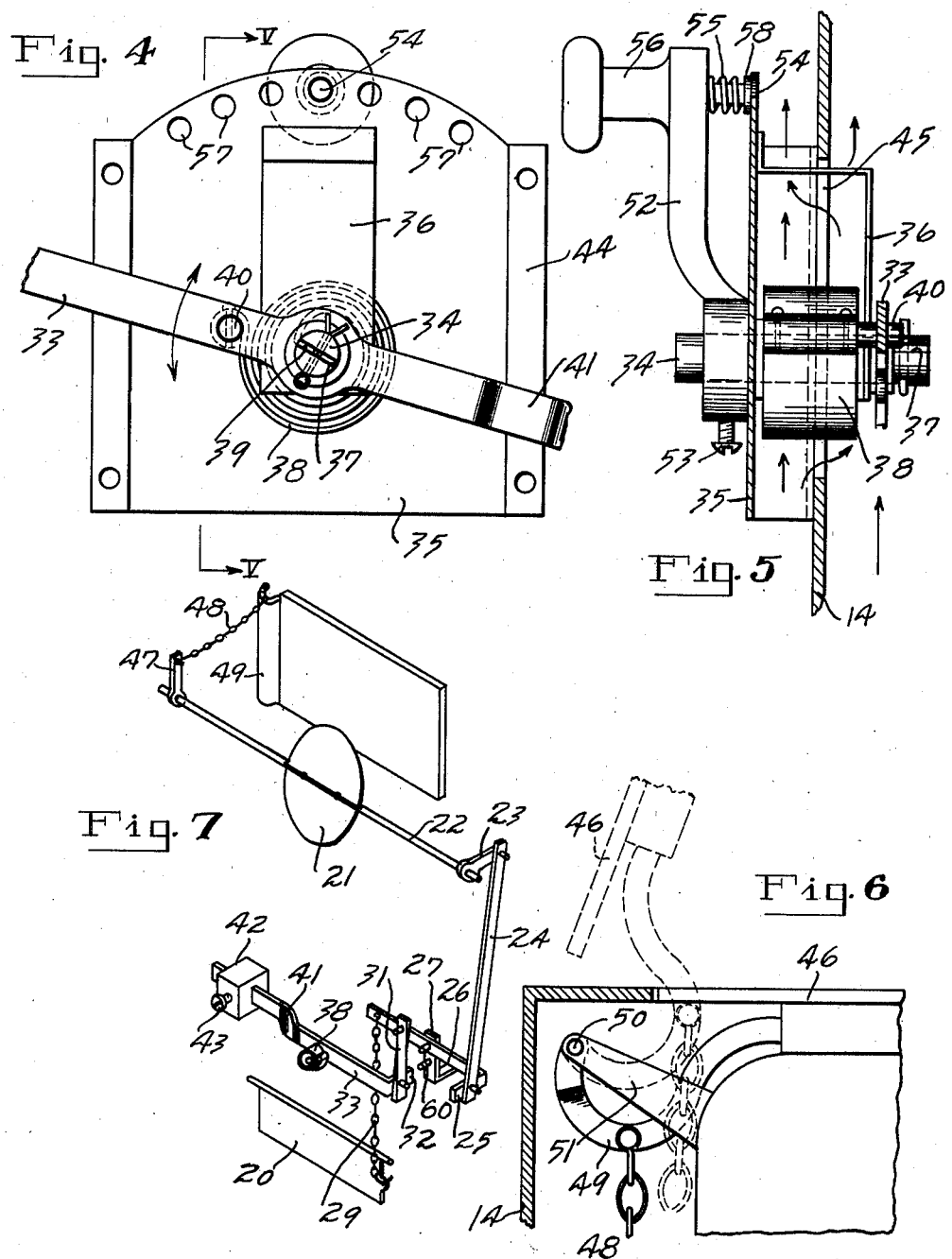

2,227,689

UNITED STATES PATENT OFFICE 2,227,689

AUTOMATIC DAMPER CONTROL FOR HEATERS

Frederick T. Agricola, Gadsden, Ala.

Application February 18, 1938, Serial No. 191,157

3 Claims. (Cl. 236—96)

My invention relates to a new and improved type of damper regulating mechanism for controlling the output of heat from a heating furnace or stove.

My present invention is more particularly, but not exclusively, adapted to circulating heaters in which a furnace proper is housed within an ornamental jacket having vents which permit a circulation of air to rise between the jacket and furnace and after being heated to escape into the room. Circulating heaters of this type are adapted to use various kinds of fuel, and while there has always existed an urgent need to so regulate the fire as to produce from them an even and controlled output of heat, yet these heaters now in general use are not equipped with any automatic regulation to that end but must depend upon a manual adjustment of their stack damper.

The object of my invention is to equip such heaters with a simple, rugged and durable control automatically responsive to a heater-induced current of air at room temperature, the radiant heat from the heater to effect an accurate and reliable regulation of the volume of air flowing through the combustion chamber of the furnace, and as a result to vary, in accordance with the room temperature requirements, the intensity of the furnace fire.

My invention also contemplates a manual setting for the automatic regulator so that it will open and close the furnace controlling dampers so as to maintain any desired temperature in a compartment or room.

One of the greatest advantages of my automatic regulation is that it will effect a material saving in fuel consumption, since it will shut off the draft as soon as the set room temperature is reached thereby checking the fire, avoiding over-heating and saving fuel. This is of particular advantage in the case of wood burning heaters, where a constant control of the drafts is necessary to prevent excessive combustion and over-heating, and for all types of heaters it affords an effective safeguard against setting fire to the building due to over-heating of the furnace.

My invention contemplates mounting the thermostat in spaced relationship to the furnace fire pot and yet in position to be directly affected by the radiant heat therefrom and also to be affected by a draft of room air induced by the temperature within the heater and caused to flow over and modify the control of the thermostat by the radiant heat.

My invention further contemplates an automatic heater control comprising a balanced damper opening into the ash compartment and a coiled bimetallic expansion unit preferably mounted at the rear of the stove and exposed both to the radiant heat from the fire pot and to heat-induced circulation of air at room temperature. By balancing the damper the effort required to cause the damper door to open and close is slight and the bimetallic thermostat is of the strong rugged type capable of expanding and contracting with sufficient power to operate the damper.

My invention contemplates presenting the coiled thermostat edgewise to the radiant heat and axially in line with the flow of the protecting air current, with the thermostat bracket designed and disposed to partly shield the inner end of the coil from the radiant heat.

My invention also contemplates mounting the thermostatic regulator in, or opposite to, a by-pass opening in the heater jacket, whereby it is made more quickly sensitive to variations in room temperature due to the direct action of the room air thereon.

My invention further contemplates the provision of a handle controlled manually operable from without the heater and so connected to the thermostat that pressure may be applied in opposition to the applied pressure of the thermostat, whereby the latter is adapted to open and close the draft damper means when exposed to different degrees of temperature.

My invention further contemplates novel and effective arrangement of the automatic/and door control mechanisms for the heat control dampers in concealed position between the jacket and the heater.

My invention further comprises the novel details of construction and arrangements of parts which, in their preferred embodiment only, are illustrated in the accompanying drawings which form a part of this specification, and in which:

Fig. 1 is a rear view of a circulating heater showing one-half of the jacket broken away and illustrating the dampers set in partially open position.

Fig. 2 is a vertical cross-sectional view taken on the line II—II of Fig. 1.

Fig. 3 is a horizontal sectional view on the line III—III of Fig. 1 with the smoke collar broken away.

Fig. 4 is an enlarged view of the thermostatic control element as viewed from the inner side.

Fig. 5 is a sectional view taken on the line V—V of Fig. 4.

Fig. 6 is an enlarged detail view showing in conventional manner one means of attaching a damper operating connection to the fire door so that when the latter is open the draft will be automatically applied to the heater.

Fig. 7 is a diagrammatic perspective view of the dampers and fire door showing the coordinated automatic and door controls for the manipulation of the heater dampers.

Fig. 8 is a diagrammatic front view of the coiled thermostat showing its functional relation to its normal temperature control setting.

Similar reference numerals refer to similar parts throughout the drawings.

I have illustrated my present invention as applied to what is commonly known as a circulating heater such as is largely used in residences, small stores and apartments, and which comprises a furnace body composed of an ash pit 10, a lower fire pot 11, and an upper dome 12 from which leads a smoke collar 13 for the stack, not shown. The heater proper is mounted within a jacket 14 which is generally of an ornamental type having top vents or louvers for the escape of air heated by its upward passage through the jacket and about the heater. This air enters in the manner well understood through apertures provided therefor in the ash pit base 15 which is supported on feet 16 and is marginally shouldered to receive and center thereon the jacket 14 in spaced relation about the heater proper. Apertures 17 in the sides of the base and apertures 18 in the front and back of the base admit an ample flow of air into the lower portion of the circulator jacket and this air flows upwardly and becomes heated by the hot walls of the heater and flows outwardly into the room. My invention is not concerned with the detail structure of either the heater or its jacket, but is applicable to any type of hot air heater in which the air is caused to circulate about a heater and thus to become heated before it is delivered into the room or compartment to be heated.

I provide in the ash pit base, preferably at the back of the heater, a draft opening controlled by a draft damper 20 hingedly mounted on pintles on its upper edge and adapted to close by gravity. This draft damper is the essential control element by means of which the volume of air admitted to the fire pot is controlled and the rate of combustion therein regulated so that the heat output requisite to maintain a predetermined room temperature will be produced so long as fuel is available in the fire pot.

I may also if desired provide at some suitable point, preferably within the smoke collar 13 inside of the jacket, a damper 21 pivotally mounted in the collar 13 on a horizontal control shaft 22 which is pivotally mounted in the collar 13 and has its ends extending beyond the dome 12 on each side at the rear.

I mount fast on one end of this shaft 22 a crank 23 which is loosely connected by a link 24 to the angled end 25 of a rocker arm 26 which is loosely pivoted on the bracket 27 which is bolted to the flange 28 (Fig. 2) of the dome 12. The rocker arm 26 on the opposite side of its pivot from link 24 is connected by a chain 29 with the draft damper 20 and is also loosely connected by a twisted link 31 with the angled end 32 of the thermostatic control arm 33.

The thermostatic control arm 33 is pivotally mounted at or near its center on a shaft 34 which is journalled so that it is free to rotate in bearings provided therefor on the control mounting plate 35. The outer bearing is formed in the plate itself and the inner bearing is formed by an angled bracket 36 suitably fastened at its upper end to the inner face of the plate 35. The bracket 36 is formed of a bent metal strip wide enough to shield a substantial part of the inner end of the bimetallic, thermostatic coil from the radiant heat (see Fig. 4), thereby leaving it more under the control of the room air current flowing freely through and around it. The inner end of the shaft, comprising that portion which projects inwardly from the plate 33, is provided with a diametric slot 37, the control arm 33 being mounted on this slotted shaft portion in the inner side of the bracket 36 and between the bracket 36 and plate 35 I mount on the slotted shaft a coiled thermostatic spring element 38 having the end 39 of its inner coil inserted in the slot 37 so as to be made fast to the shaft 34. The end of the outside coil of this thermostatic coil 38 is riveted or bolted fast to a pin 40, the inner end of which pin is loosely engaged in a hole on the arm 33. The arm 33 beyond the pin 40 has formed therein an offset 41 beyond which it provides an extension upon which a counterweight 42 is slidably and adjustably mounted, this weight being held in its adjusted position by the set screw 43. By adjusting this counterweight I counterbalance the load of the control mechanism borne by the other end of the arm 33, thus relieving the coil of all but the friction load of the control mechanism in the performance of its regulating functions in which it opens and closes the draft.

It will be noted, particularly by reference to Figs. 4 and 5, that the plate 35 is formed with inturned ends terminating in out-turned flanges 44 which are bolted to the back wall of the jacket 14 opposite an opening 45 therein (Fig. 5) through which the bracket 36 and the shaft 37 project into the jacket. From the arrangement shown it will be obvious that the thermostatic coil 38 is substantially removed from the fire box and while disposed almost entirely without the jacket it is yet in a position to be exposed both to the radiant heat from the fire pot and to a current of room air induced by the heater to flow upwardly under plate 35 and inwardly through the by-pass opening 45 and in so flowing to envelop and protect the thermostat by flowing freely through and around its coils so that it can without damage stand intense radiant heat and yet at the same time will always have its operating temperature modified and controlled by the current of air at room temperature in which it operates.

On the end of the shaft 22 on the side of the hinges for the fire door 46, I mount fast a crank 47 and connect it by a chain or flexible connection 48 to an element movable with the fire door in such manner that the opening of the fire door will draw the chain forwardly, swinging the crank 47 toward the front of the heater and turning shaft 22 so as to open the smoke damper 21. As shown, the fire door comprises a curved hinge member 49 pivotally connected by a hinge pin 50 between the arms 51 fast on the fire dome 12, and the chain connection 48 is so applied to this curved hinge member 49 that it will be drawn from full line to dotted line position (Fig. 6) upon the opening of the fire door to dotted position, Fig. 6.

All of the hinge connections for the elements 24, 26, 31 and 33 are loose pivotal connections comprising a pivot pin, a washer, and a cotter key, or the like, inserted through its outer end, leaving the arm free to both rock and have limited angular play so that it will not bind throughout the adjustments of the damper control mechanism.

The shaft 34 on its overhung outer end has a control arm 52 made fast thereon by a set screw 53, this arm carrying at its upper end a detent 54 actuated by a spring 55 and adapted to be manipulated by the handle 56, the detent being slidable through the upper end of the arm and through a washer 58 into engagement with one or the other of an arcuate series of holes 57 arranged concentric to the shaft 34 in the arched upper edge of the plate 35.

A stop pin 60 is mounted in the bracket 27 below the arm 26 and in position to be engaged by said arm when it reaches either full open, or full closed, damper position.

The rocking of the control arm 52 to the right or to the left, as viewed in Fig. 1, results in a corresponding rotation of the shaft 34, which rotation is transmitted through the coil 38 to the arm 33 and from the latter through the transmission mechanism described so as to move the dampers nearer to or farther from a closed position. Thus, as seen in Fig. 8, by rocking control arm 52 to its extreme position to the left, rocker arm 33 is rocked counter-clockwise until the dampers approach full open position. On the contrary when the control arm is shifted to the right in this figure the arm 33 is rocked clockwise and through the transmission described the dampers are moved to approach their full closed position.

In applying the setting adjustment if the dampers at the time are in fully open or closed position and the adjustment happens to be in a direction which tends to rock the arm 26 against its stop pin 60, with which it is already engaged at the time, the setting can still be made by being absorbed in the coil 38 without change in position of arm 26 and the tension thereby set up in the coil will have to come out before it will commence to move the dampers.

It will be understood that the controls may be mounted on the back or either side of the jacket 14, it being only necessary to make obvious adjustments and arrangements of parts to accommodate them to their changed position with relation to the fire door and dampers.

To set up the heat control for service the counterweight 42 should be so adjusted as to balance the draft door 20 when the control arm 52 is set for high room temperature, the furnace being cold, the draft damper should stand wide open and upon turning the control arm 52 the lowest temperature possible the draft damper should stand closed tightly. Having checked this counter-balanced setting of the draft door and thermostat it will be understood that if the stack damper 21 is also to be controlled the counterweight 42 must be set to counter-balance its operating connections also. To start up the furnace the control should be set at the highest temperature possible, thus admitting ample draft to the fire pot to enable the fire to be started, otherwise if the control arm is set for medium or low temperature positions it might automatically close the draft door before the fire had become well ignited. After the fire has a good start, the draft control arm should then be set for the desired temperature.

Assuming the control arm 52 set in intermediate position where it is intended to maintain say, a temperature of 70° F. in the room, the rocker arm 33 in its normal operating position will stand approximately midway between open and closed position for the dampers, but if we assume the heater to be cold, the resulting contraction of the coiled thermostat 38 will set the rocker arm 33 in position to open the dampers. In other words, the contraction of the thermostat coil, as viewed in Fig. 8, results in a raising of the control end of arm 33 so as to produce an open position for the dampers. When a fire is built in the heater and the thermostat begins to heat up, its coils tend to straighten, pulling the arm 33 down toward dotted position, Fig. 8, and thus tending to close the dampers. The thermostat continues to straighten under the joint control of radiant heat and the enveloping circulation of room air until the latter attains the critical temperature desired, whereupon the damper assumes a closed position, thus checking the fire until the room temperature commences to fall and the radiant heat to diminish. My thermostat, though rugged and durable, is yet sufficiently sensitive to respond to a drop of from 1° to 2° F. in room temperature and to start opening the draft door 20 to increase the rate of combustion in the fire box and with it the radiant heat until the drop in room temperature is arrested and begins to increase until it again reaches the critical temperature upon which the damper 20 is again closed, and this operation continues with the room temperature held substantially constant so long as there is a fuel supply within the heater. Under actual tests, using a coil bimetallic expansion unit of substantially the type illustrated, for the lowest temperature setting of the control the draft damper 20 remains closed. For the next lowest setting of the control the damper 20 starts to close at a temperature of 86° F. of the thermostatic unit and is completely closed at 106° F. temperature of said unit, these temperatures representing the combined effect of radiant heat and the temperature of the enveloping room draft upon the thermostatic unit. For the middle control position of the thermostat, the damper starts to close at a temperature of 120° F. of the thermostatic unit and it is completely closed when the thermostatic unit obtains a temperature of 176° F. At the high setting a temperature of 200° F. is required to completely close the draft door 20.

Whenever the fire door 46 is opened to introduce fuel, or to attend to the fire, the forward swing of the hinge member 49, acting through the chain connection 48, will pull both dampers to their full open position, this movement being counter to the tension of the coiled thermostat 38 will, unless the dampers are already open, result in a tightening of the coil 38, and as soon as the fire door is closed the dampers will immediately be drawn back by the spring action of the thermostatic coil 38 to their previous setting. In this way at all times, when the fire door is opened, the dampers will be in full open position without disturbing the automatic controls that are in force at the time. It is important to note here that the thermostatic coil 38 is set away from the furnace in a position where it is not subjected to high temperatures and therefore it will not become distorted by the pull on it from the fire door, nor by the action of high temperatures, and this will be true even when the fire box is at red heat.

The free induced flow of air at room temperature through and around the thermostat protects it effectively from heat injury and direct response to furnace heat, and enables a rugged instead of a delicate bimetallic thermostat to be used, the combined effect of the room-air temperature and the radiant furnace heat making such a rugged thermostat act sensitively and respond quickly to small room temperature changes. The bracket 36 can be designed to shield the thermostat to the desired extent from the radiant heat.

What I claim is:

1. In a circulating heater having an external jacket with inlet and outlet means for the circulation upwardly therethrough of a main current of room air to be heated, said jacket having a side opening therein for the admission thereinto of a control current of relatively cool room air, a U-shaped frame mounted externally of the jacket in front of the opening to form a vertical flue over said opening, a shaft journalled in said frame with its inner end projecting through the opening, a thermostat coiled about the shaft with its axis in line with the flow of air through said jacket opening and its inner convolution made fast to said shaft, a lever mounted for oscillation on said shaft and having the outer convolution of said thermostat anchored thereto, damper means connected to said lever arm to regulate the rate of combustion in the heater, and means to set the range of control for high, low or intermediate room temperature.

2. In a circulating heater having an external jacket with inlet and outlet means for the circulation upwardly therethrough of a main current of room air to be heated, said jacket having a side opening therein, a frame mounted externally of the jacket to form a vertical flue open at the bottom and the top over said opening, a shaft journalled in said frame with its inner end projecting through said opening, a bimetallic thermostat coiled about the shaft and disposed partly within said flue and partly within the jacket surrounding the heater, a bracket supporting the inner end of said shaft beyond the thermostat, a lever arm mounted for oscillation on the shaft, means connecting the outer convolution of the thermostat to the lever arm, and a control damper operatively connected to the lever arm.

3. Apparatus according to claim 2, in which the thermostat is substantially smaller in diameter than the opening in the jacket to afford communication between said flue and said opening, and in which a counterweight is provided for said lever arm.

FREDERICK T. AGRICOLA.